W. P. MAYS.
HOOD FOR MOTOR VEHICLES.
APPLICATION FILED JULY 18, 1908.
959,571.
Patented May 31, 1910.
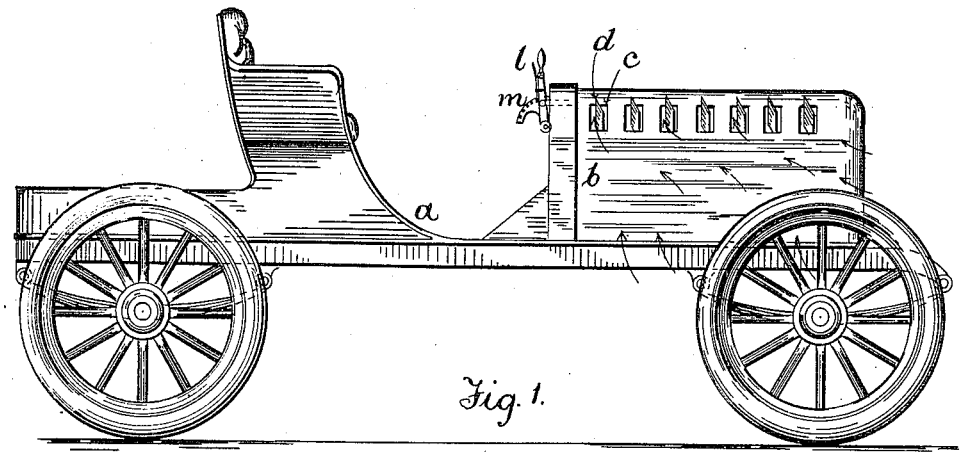
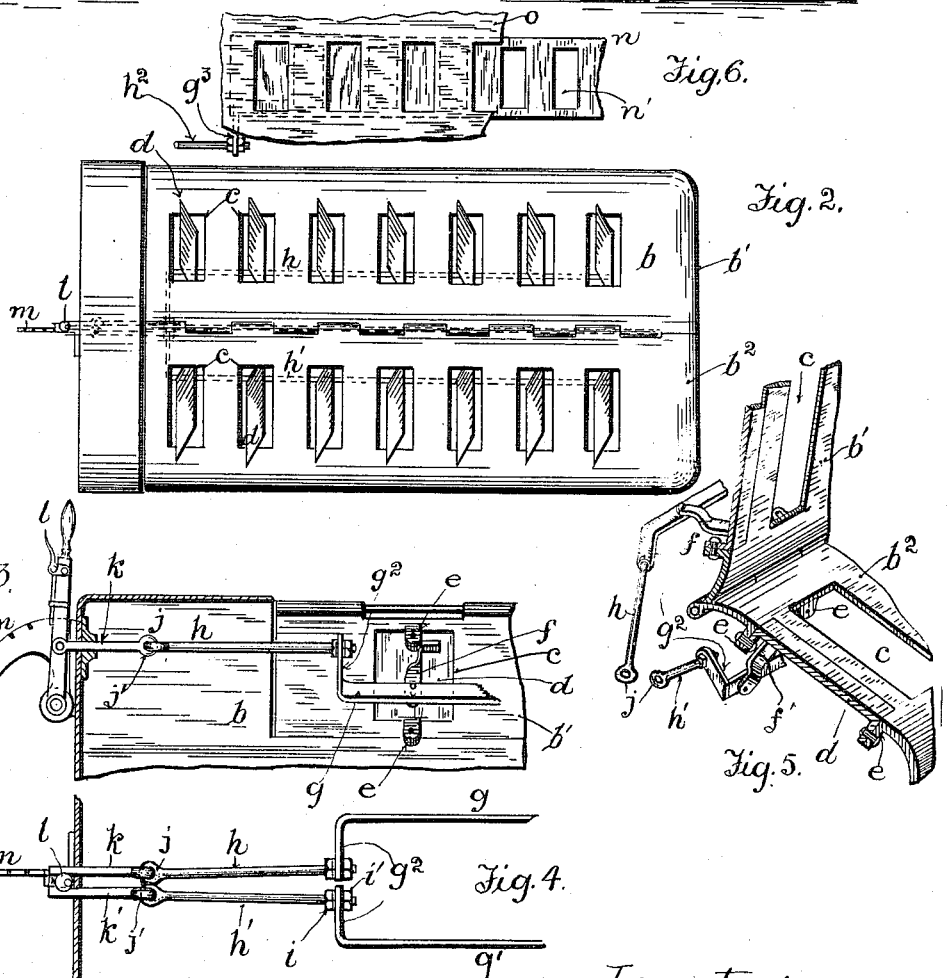
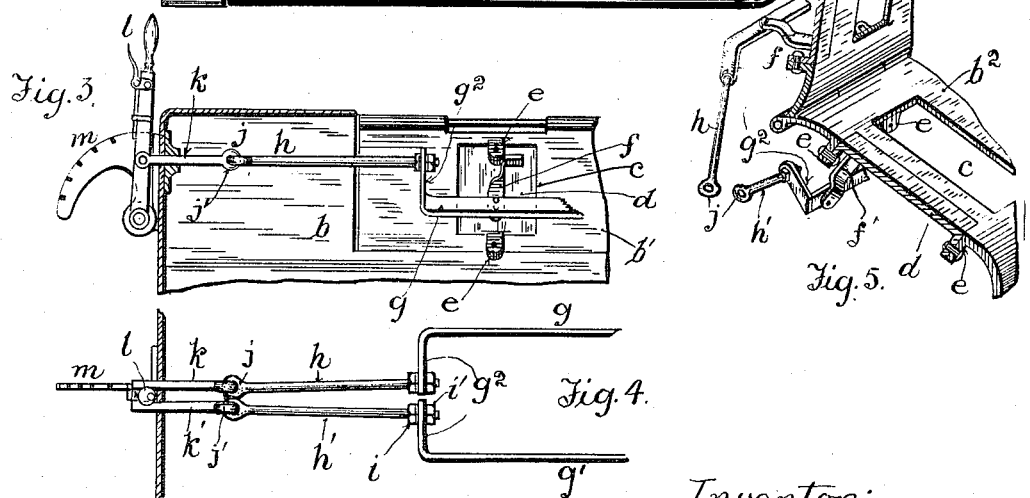
Witnesses:
Cecil Long
S. M. Philbrick
Inventor:
Wilson P. Mays
by T. J. Geisler
Atty.

UNITED STATES PATENT OFFICE.

WILSON P. MAYS, OF PORTLAND, OREGON.

HOOD FOR MOTOR-VEHICLES.

959,571. Specification of Letters Patent. Patented May 31, 1910.

Application filed July 18, 1908. Serial No. 444,269.

*To all whom it may concern:*

Be it known that I, WILSON P. MAYS, a citizen of the United States, and a resident of Portland, in the county of Multnomah and State of Oregon, have invented a certain new and useful Improvement in Hoods for Motor-Vehicles, of which the following is a specification, reference being had to the accompanying drawings as constituting a part thereof.

This invention relates to automobiles, and has for its object to provide means, conveniently operable, at will, for promoting rapid circulation of air through the housing inclosing the motors, for the purpose of more efficiently cooling the latter under certain conditions. The motors are inclosed by housing to keep out dust, and one of the most efficient means for ventilating the motor housing, obviously, consists in providing the roof of the housing with sufficient openings for the escape of the heated air. This arrangement has, however, the objection that when the automobile is run at a considerable speed the currents of air emitted through said roof-openings would be directed against the faces of the occupants of the car and be very offensive. For this reason, prior efforts have been made to render the openings in the roof of the housing controllable, but the means provided to this end, in my judgment, were impractical. The fact is, that it is only desirable to open the roof of the motor housing, so as to promote rapid circulation of air, when the car is running on an up-grade; for then the motion of the car is not fast, but a greater strain is imposed upon the motors, causing them to evolve a greater degree of heat than when running on the level; and, of course, if such excessive heat is not dispersed, the motors become overheated, and as a result the life of the machine is shortened. Therefore, to obtain my object, I provide in the roof of the motor-housing a series of openings, each having an adjustable closure operable by a lever, or like device, placed within the reach of the chauffeur; and thus the instant the car starts to travel on an up-grade the roof-apertures may be thrown wide open, and as soon as the top of the grade has been reached, the same may be immediately closed again. To this end my invention embodies the arrangement and combination of parts hereinafter fully described and illustrated in the drawings above referred to.

In the drawings, Figure 1 is a side elevation of an automobile with my invention installed as in practice; Fig. 2 is a top view of the motor-housing, showing the roof thereof provided with a series of air apertures, controllable by pivoted plates operable as a unit; this view being drawn on a larger scale than Fig. 1; Fig. 3 is a longitudinal sectional-detail of the motor-housing, this detail being shown on a still larger scale than Fig. 2, and illustrates, in particular, the means provided for moving the closure-plates as a unit; Fig. 4 is a plan detail of the mechanism for adjusting the closures of the apertures in the roof of the housing; Fig. 5 is a detail, in perspective, showing a portion of the roof of the motor-housing, the type of housing shown being of the kind in which the roof is composed of two half-sections hinged on a longitudinal axis, so as to permit each half-section to be lifted to permit access to the motors; and this detail shows some of the devices entering into the combination of my invention; and Fig. 6 is a partial view of the roof of the motor-housing, drawn on a scale approximately agreeing with that of Fig. 2, but illustrates closing means consisting of an apertured slide longitudinally movable under the roof by means substantially the same as provided for moving the pivoted closures illustrated in the foregoing figures.

The letters designate the parts described.

The body, $a$, of the automobile may be of any type. The roof of the housing, $b$, containing the motors or engine, is provided with a plurality of rectangular apertures $c$.

As shown in Figs. 1, 2, 3, and 5, the roof of the hood comprises two half-sections $b'$, $b^2$, hinged on a longitudinal axis so as to permit either half-section to be raised on its hinge, for the purpose of giving access to the motor mechanism within the housing. In each of the apertures, $c$, is pivoted, on a transverse axis, a plate. The pivoting of the plates $d$ may be accomplished by providing the roof of the housing and the plates $d$ with registering ears $e$, in which are inserted hinge-pins, as shown. To the under side of the plates $d$ are fastened lugs $f$, suitably shaped, as illustrated in Figs. 3 and 5, so as to render it convenient to connect therewith longitudinal rods $g$, $g'$. That is to say, the entire series of pivoted plates $d$ in the half roof-section $b'$ are pivotally connected with the rod $g$, and the opposite series of plates $d$, pivoted in the half-section $b^2$, are pivotally connected with the rod $g'$. To the rods $g$, $g'$ are connected link members $h$, $h'$. The connection may be conveniently accomplished by making the inner right-angular ends $g^2$ of the arms $g$, $g'$ with eyes, through which the rod-like link-members $h$, $h'$ are inserted, the extremities of said link-members being threaded to receive nuts $i$, $i'$. The idea being that there must be sufficient play allowed in the connection so as to permit the connected parts to operate as described.

The left ends of the link-members $h$, $h'$ are provided with eyes $j$, and to the latter are connected the eyes $j'$ of the link-members $k$, $k'$. Thus the joint so obtained between the extremities of the link-members $h$, $h'$ and $k$, $k'$ is in the nature of a universal joint. The link-members $k$, $k'$ are connected at their left ends to a lever $l$, operating over a quadrant $m$; the parts being arranged to permit the adjustment of the lever $l$ on the quadrant to set the closure-plates $d$ in such wise as to partially or fully open the apertures $c$, or entirely close the same, as required.

My preferred arrangement of the apertures $c$ and of the plates $d$ therein pivoted on a transverse axis, is shown in Fig. 5. That is to say, the hinged lugs $e$ and the plates $d$ are adapted to allow the latter, when closed, to become so arranged as to make a flush upper surface on the roof of the housing. This particular construction, however, is of course not an indispensable feature of my invention. Any convenient arrangement of the parts, efficient for the purpose intended, will answer as well. But since the roof of the motor-housing is preferably made in two half-sections as described, the means controlling the air apertures $c$ must be contrived to permit the lifting of either half-section of the housing-roof without disconnecting or otherwise having first to adjust any of the parts.

In the modified type of my invention, illustrated in Fig. 6, the pivoting plates $d$ are omitted, and in place thereof I use a slide $n$, having apertures $n'$ adapted to register with the apertures in the housing-top $o$, when the slide $n$ is moved into registering position. The mechanical features of this modification are self explanatory. The housing-top $o$ is provided with guides (not shown) for the slide $n$ to slide in. The slides are connected in any convenient manner with rods $g^3$, of similar purpose as the rods $g^2$, and link-members (one of which, $h^2$, is shown) are used to connect the bars $g^3$ with devices like the quadrant and lever $l$, $m$, shown in the preceding figures, as means for adjusting the slides $n$, to control the apertures in the roof of the housing $o$, as required.

It will be remembered that the construction of the housing for the motors of the automobile is such as to provide an opening in the front end and bottom of the housing for cooling drafts to enter (said drafts being indicated in Fig. 1 by arrows).

When the motors of the automobile in which my invention is installed do normal work, as for example, running at normal speed along a substantially level track, the ventilating apertures in the roof of the housing of the motors will be closed, so as to prevent the offensive odors from continuously being thrown against the faces of the occupants of the car; but as soon as the car is running on an up-grade, or the motors are required to do any unusual amount of work, causing the development of an excessive degree of heat, the closures of the ventilating apertures in the roof of the motor-housing are thrown open to cause the cool air currents, entering through the front and the bottom of the motor-housing, to continuously disperse the heated air through said roof-apertures. It is, therefore, apparent that in order to accomplish the purpose of my invention, it is not only required that the roof of the housing confining the motors be made with sufficient apertures to allow the escape of the excessively heated air, but that there be also provided means for controlling said air apertures, substantially as above described.

I claim:

1. The combination of a motor-housing having a roof consisting of two half-sections hinged on a longitudinal axis, each section provided with a series of longitudinally alined apertures, movable closure-plates arranged to control said apertures, a quadrant and lever, and connections of the universal-joint principle between said lever and the connecting rods of the closure-plates adapted to operate the latter as a unit.

2. The combination of a motor-housing having a roof consisting of two half-sections hinged on a longitudinal axis, each section provided with a series of longitudinally alined apertures, a closure-plate rotatably hinged on a transverse axis in each aperture controlling the latter, a pair of rods, and connections fastening said closure-plates thereto, a quadrant and lever, and connections of the universal-joint principle between said lever and the connecting rods of the closure-plates adapted to operate the latter as a unit.

3. The combination of a motor-housing having a roof consisting of two half-sections hinged on a longitudinal axis, each section provided with a series of longitudinally alined apertures, a closure-plate rotatably hinged on a transverse axis in each aperture controlling the latter, a rod arranged under each half-section of the housing-roof, lugs on the underside of the rotatable closure-plates by which the latter are pivotally connected with said rods, a quadrant and lever, and connections of the universal-joint principle between said lever and the connecting rods of the closure-plates adapted to operate the latter as a unit.

4. The combination of a motor-housing having a roof consisting of two half-sections hinged on a longitudinal axis, each section provided with a series of longitudinally alined apertures, a closure-plate rotatably hinged on a transverse axis in each aperture, controlling the latter, a rod arranged under each half-section of the housing-roof, lugs on the underside of the rotatable closure-plates by which the latter are pivotally connected with said rods, a quadrant and lever, and a pair of links connecting the inner ends of said rods, respectively, with said lever, said links comprising jointedly connected members, the inner ends of said rods being bent at an angle, substantially as described.

5. The combination of a motor-housing having a roof consisting of two half-sections hinged on a longitudinal axis, each section provided with a series of longitudinally alined apertures, a closure-plate rotatably hinged on a transverse axis in each aperture, controlling the latter, and adapted, when closed, to be arranged flush with the top of said housing-roof, a rod arranged under each half-section of the housing-roof, lugs on the underside of the rotatable closure-plates by which the latter are pivotally connected with said rods, a quadrant and lever, and a pair of links connecting the inner ends of said rods, respectively, with said lever, said links comprising jointedly connected members, the inner ends of said rods being bent at an angle, substantially as described.

6. The combination of a motor-housing having a roof consisting of two half-sections hinged on a longitudinal axis, each section provided with a series of longitudinally alined apertures, a closure-plate rotatably hinged on a transverse axis in each aperture, controlling the latter, and adapted, when closed, to be arranged flush with the top of said housing-roof, a rod arranged under each half-section of the housing-roof, a quadrant and lever, and connections of the universal-joint principle between said lever and the connecting rods of the closure-plates adapted to operate the latter as a unit.

WILSON P. MAYS.

Witnesses:
 CECIL LONG,
 T. J. GEISLER.